(12) United States Patent
Juen

(10) Patent No.: US 6,459,449 B1
(45) Date of Patent: Oct. 1, 2002

(54) COLOR REPRODUCTION CORRECTION DEVICE AND CORRECTION METHOD FOR AN IMAGING APPARATUS

(75) Inventor: Masahiro Juen, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/998,027

(22) Filed: Dec. 24, 1997

(30) Foreign Application Priority Data

Dec. 28, 1996 (JP) .............................................. 8-357917

(51) Int. Cl.[7] .................................................. H04N 5/76
(52) U.S. Cl. ........................................ 348/223; 348/231
(58) Field of Search ................................ 348/222, 223, 348/224, 225, 226, 227, 231, 232, 234, 239, 272, 273, 277, 282; 358/512; H04N 5/76

(56) References Cited

U.S. PATENT DOCUMENTS

| | | | |
|---|---|---|---|
| 5,612,738 A | 3/1997 | Kim ............................ | 348/223 |
| 5,691,772 A | 11/1997 | Suzuki ......................... | 348/223 |
| 5,805,213 A | 9/1998 | Spaulding et al. ........... | 348/222 |
| 5,808,681 A | 9/1998 | Kitajima ...................... | 348/371 |
| 5,896,014 A * | 4/1999 | Ogawa et al. ............... | 348/224 |
| 6,034,724 A * | 3/2000 | Nakamura ................... | 348/241 |

* cited by examiner

*Primary Examiner*—Tuan Ho
(74) *Attorney, Agent, or Firm*—Morgan, Lewis & Bockius LLP

(57) ABSTRACT

A color reproduction correction device for an imaging apparatus that obtains color signals with a plurality of spectral characteristics by imaging an object to be imaged. A color image is obtained by subjecting the color signals to signal processing, wherein the color reproduction correction device includes a light source inferring device which infers the type of illuminating light source being used. A memory device stores, for each of a plurality of predetermined light sources, constants for correction matrix operations which are determined so that the mean values of the absolute values of the distances between values obtained by converting the positions on a uniform color space of each of the plurality of colors of the object illuminated by the respective light sources into the respective corresponding positions on the uniform color space when white light from the reference light source of a display device taking into consideration the adaptive effect of the eyes, and the positions on the uniform color space of colors corresponding to the respective colors of the object being imaged that are obtained when output signals produced by applying the correction matrix operations to the color signals of the imaging device are displayed by the display device, are minimized. The operating device also extracts correction matrix constants corresponding to the illuminating light source inferred by the light source inferring device from the memory device and performs correction matrix operations on the color signals, at the time of imaging.

28 Claims, 6 Drawing Sheets

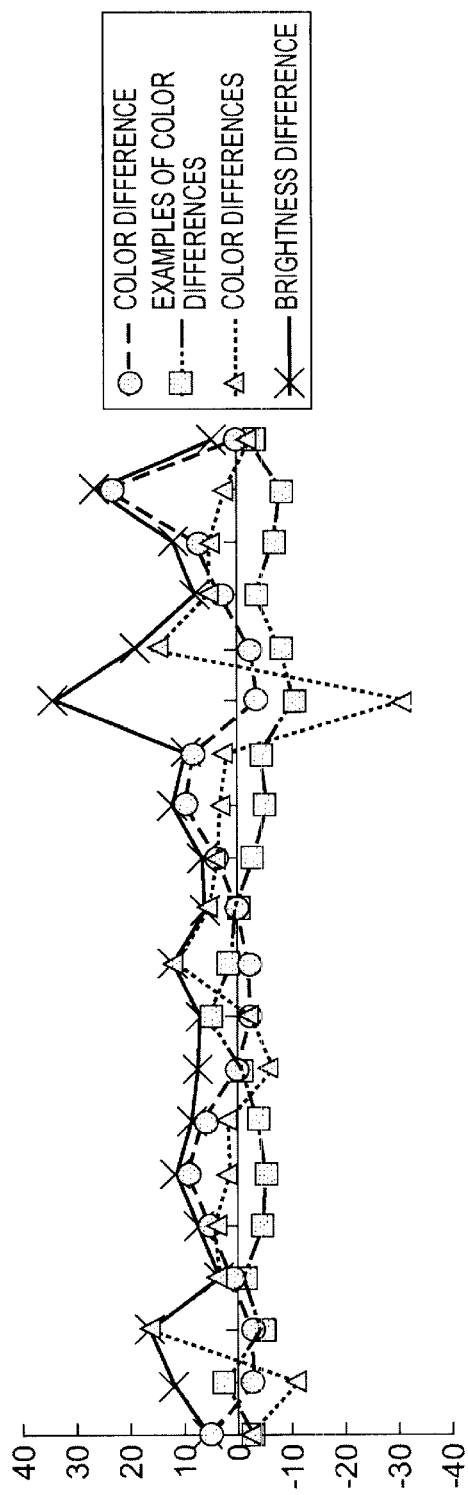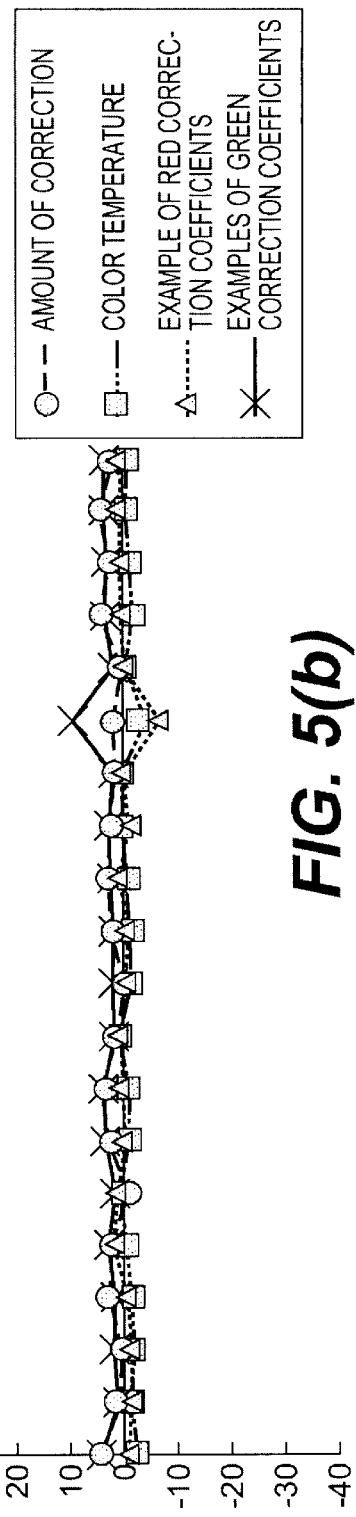
FIG. 5(a)
FIG. 5(b)

COLOR REPRODUCTION CORRECTION DEVICE AND CORRECTION METHOD FOR AN IMAGING APPARATUS

This application claims the benefit of Japanese Patent Application No. 08-357917, filed in Japan on Dec. 28, 1996, which is hereby incorporated by reference.

BACKGROUND OF THE INVENTION

1. Field of the Invention

The present invention relates to a color reproduction correction device and method for an imaging apparatus, and more particularly to a technique wherein images of an object acquired by means of a color-image imaging device, such as a television camera or the like, can accurately be reproduced in accordance with the colors as seen by the operator of the imaging apparatus even if the light source used for illumination of the object varies.

2. Discussion of the Related Art

The human eye generally sees a white surface of an object as white regardless of the type of illumination involved. This property of the human eye is referred to as visual adaptation. In a color-image imaging apparatus, such as a television camera or the like, an adjustment is made in order to reproduce the visual adaptation of the human eye so that the output signals of the three primary colors used in imaging are the same when a white object is imaged regardless of the illumination. This technique is called white balance processing.

However, the three primary colors, red (R), green (G), and blue (B), used in imaging do not necessarily have the same characteristics as those exhibited by the human eye. Furthermore, the physical characteristics of the reference white color of the display devices displaying the results of the imaging differ from the illumination actually used in the imaging process. Because of these factors, colors other than achromatic colors may appear different from the colors of the actual object when the results of the imaging are viewed by means of a display device. In cases where the viewers have no knowledge of the colors at the imaging site, as in broadcasts, no problems exists as long as the colors match the colors in the memory of the viewers. However, when the colors themselves are critical, as in printed documents, or when the imaging is required to illicit a feeling of actual presence the difference between the object image and the displayed image colors requires improvement.

A linear matrix method is a conventional method employed to improve the color reproduction of color-image imaging devices, such as television cameras, used for broadcasting and similar applications. For example, in conventional television cameras, in which three types of color signals are produced, i.e., red (R), green (G), and blue (B), corrected red, green, and blue signals are obtained via a matrix circuit that mixes the signals with each other. These corrected signals are then subjected to signal processing, thus producing a video signal for television use.

However, procedures for determining the constants employed in matrices used for color reproduction correction have not always been firmly established. Historically the constants were selected by trial and error until visually pleasing results were obtained. Accordingly, linear matrix constants, which produce optimal results in cases wherein the light source used to illuminate the imaging object varies, have not been obtained. Therefore, linear matrix circuits are not used in most cases. Alternatively, color tones are adjusted by adjusting the hue and amount of color on the basis of visual determinations made by broadcast technicians using an imaging monitor.

In devices, such as home-use video cameras, video signals are obtained predominantly from a single imaging element utilizing three types of color filters that are applied to each pixel. However, since there are limits to the spectral characteristics of the filters, which can be mounted on the imaging element, the color reproduction is generally poor. Correction in those devices is generally accomplished by adjusting the hue and amount of color so that color tones, which are close to skin color (for which the eye has a high color discrimination sensitivity), will be favorable under the illumination most frequently used. Generally, variations in the illumination light source is handled only by white balance processing that adjusts the levels of the red, green, and blue, generally referred to as (RGB) signals so that the color white seen by the eyes is imaged as white.

Furthermore, a common problem associated with the respective devices described above is that there is no attempt to reproduce the appearance of colors according to the illumination used. The color reproduction is selected on the basis of whether the finished image is appealing to the viewer's eye. Therefore, the atmosphere and/or feeling generated by the actual illumination is ignored. This problem occurs because no method has been established for determining correction matrices that takes into consideration the fact that since the reference white color of the television monitor of a display device does not necessarily coincide with the white color of the actual illuminating light that illuminates the imaging object. The reference white color displayed "as is" may differ from the color viewed directly by a live observer. Accordingly, it is necessary to investigate color reproduction by determining if imaging is performed under illumination from a white incandescent lamp or under outdoor sunlight, which heretofore has been ignored.

SUMMARY OF THE INVENTION

Accordingly, the present invention is directed to a color reproduction correction device that substantially obviates one or more of the problems due to limitations and disadvantages of the related art. An object of the present invention is to allow color reproduction correction, by means of a simple construction of a color reproduction correction device and method for an imaging apparatus, in which correction is accomplished by determining color reproduction correction matrices so that colors seen by the operator of the imaging apparatus can be accurately reproduced by a display device even if the light source used for illumination of the object varies.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color reproduction correction device for an imaging apparatus obtains color signals, with a plurality of spectral characteristics, by imaging an object and obtaining a color image. The color image is obtained by subjecting the color signals to signal processing, wherein the reproduction correction device includes a light source inferring device, which infers the type of illuminating light source being used, and a memory device, which stores, for each of a plurality of predetermined light sources, constants for correction matrix operations. The constants are determined so that the mean values of the absolute values of the distances between values obtained by converting the positions on a uniform color space of each of a plurality of colors of the object to be imaged illuminated by the respective light sources into the respective corresponding positions on the uniform color space in the case of white light from the reference light source of a display device that uses as reference white light a light source that may not coincide with the white light of the light source used for the illumination taking into consideration the adaptive effect of the eyes; the positions on the uniform color space of colors corresponding to the respective colors of the object to be imaged that are obtained when output signals produced by applying correction matrix operations to the color signals of the imaging device imaging the object are displayed by means of the display device, are minimized, thus insuring that the visual appearance of the plurality of colors of the object to be imaged under the illumination is approximately comparable to the visual appearance of the colors corresponding to the respective colors of the object to be imaged in an image obtained by displaying by means of the display device the output signals obtained by imaging the illuminated object by means of the imaging apparatus; and an operating device which extracts correction matrix constants, corresponding to the illuminating light source (inferred by the light source inferring device), from the memory device, and performs correction matrix operations on the color signals, at the time of imaging.

Thus, colors viewed by the human eye can be accurately reproduced by a display device if the visual stimulus color values of the object to be imaged are captured under the specific illumination and are converted into visual stimulus color values. Reproduction by the display device, the correction matrix constants, in the form of the visual stimulus color values, are employed to adjust the color values of the display device. These color adjustments approximate the color values associated with the specific illumination employed at the time of the object being imaged. Such a conversion of stimulus values is equivalent to the expression of color appearances under one illumination to those as seen under another illumination. Therefore, a model of the color adaptation of the human eye can be applied to such a conversion. Accordingly, reference stimulus values are obtained by measuring, for each of the plurality of light sources, the visual appearance of a plurality of colors of the object to be imaged as seen under the illuminating light source and converting these values into stimulus values that expresses the reference white color of the display device.

Correction matrix operations are then applied to the color signals of the imaging apparatus and the imaged stimulus values are determined from the resulting values. The stimulus values are then compared with the previously determined reference stimulus values and the constants of the correction matrices are determined so that the error between the respective stimulus values is minimized. The constants are then stored in the memory device. At the time of imaging, if the correction matrix constants of the illuminating light source, discriminated by a light source inferring device, are called up from the memory device and correction matrix operations are applied to the color signals, the desired color reproduction correction can be performed so that optimal color reproduction can be realized.

It is desirable that the light illuminating source inferring device infer the type of illuminating light source employed based on the white balance control signal that is utilized to perform white balance processing on the plurality of color signals.

Since the white balance control signal varies according to the spectral distribution of the illuminating light source, the type of the illuminating light source being used can easily be inferred and the construction of the device can also be simplified.

In another aspect of the present invention, color signals with a color reproduction correction device is equipped with a light source inferring device that infers the type of illuminating light source being used and a memory device that stores, for each of a plurality of predetermined light sources, constants for correction matrix operations.

The constants for correction matrix operations are determined as follows. The mean values of the absolute values of the distances between (a) and (b) are minimized. The (a) values are values obtained by converting the positions on a uniform color space, of each of a plurality of colors of the object to be imaged, illuminated by the respective light sources into the respective corresponding positions on the uniform color space in the case of white light from the reference light source of a display device, which uses as the reference white light a light source that may not coincide with the white light of the light source used for the illumination (taking into consideration the adaptive effect of the eyes). The (b) values are the positions on the uniform color space of colors corresponding to the respective colors of the object to be imaged that are obtained when output signals produced by applying correction matrix operations to the color signals of the imaging device are displayed by means of the display device. Thus the visual appearance of the plurality of colors of the imaging object is approximated comparable to the visual appearance of the colors of the imaging object under the respective illumination light.

Furthermore, a constant inferring device is employed. This device infers the correction matrix constants that approximate most closely the illuminating light source inferred by the light source inferring device by performing operations based on the constants stored in the memory device at the time of imaging. Finally, an operating device uses the constants output by the constant inferring device to perform correction matrix operations on the color signals at the time of imaging.

The constants of the correction matrices vary according to the type of illumination. Accordingly, it is impractical to prepare correction matrix constants for all possible types of illumination. Therefore, correction matrix constants are determined for several predetermined light sources and are stored in the memory device. The correction matrix constants, which most closely approximate the illuminating light source used, can be determined by the constant inferring device by interpolation from the values of the constants stored in the memory device. As a result, the construction of the device is simplified and accurate color reproduction correction can be efficiently performed.

It is desirable that the light source inferring device infer the type of illuminating light source used based on the white balance control signal that is used to perform white balance processing on the plurality of color signals. The white balance control signal has a spectral distribution that varies according to the type of illuminating light source used. Accordingly, the type of illuminating light source being used can be easily and accurately inferred from the white balance control signal, and the construction of the device can again be simplified.

Furthermore, in the correction matrix operations, each of the plurality of output signals following the correction operation can be expressed as the sum of one color signal of the plurality of color signals and values obtained by multiplying each of a plurality of difference signals between the plurality of color signals by a constant.

By applying correction matrix operations to the signals obtained by applying white balance processing to the plurality of imaged color signals, it is possible to ensure that white objects appear white. Also, a constraining condition, which prevents any variation in the white balance following correction, can be applied. Accordingly, the sum of the coefficients in the row direction of the correction matrices can be set equal to 1. Consequently, the outputs following correction can be obtained by summing the values obtained by applying correction matrix operations to the color difference signals such as (G-R), (G-B) and to the color signals prior to correction. In this way the number of variables required for color reproduction correction can be reduced, so that the construction of the device and the processing can further be simplified.

The device may also be constructed so that the color signals, with a plurality of spectral characteristics, are selected in such a manner that the variation in the constants applied to the difference signals between the plurality of color signals in the correction matrices of the respective color signals is minimized, even if the illumination utilized to illuminate the object varies. For example, if color filters with appropriate spectral characteristics are used, situations can occur in which illumination having different color temperatures will have little effect even if the amount of correction of the color difference signals is almost zero. In such cases the number of variables in the correction matrices can be reduced even further.

It is desirable to have the operating device perform correction matrix operations on a plurality of color signals obtained by performing white balance processing on the plurality of color signals. By performing correction matrix operations it is also possible to reduce the number of variables in the correction signals so that the construction of the device and the processing can be further simplified.

In a further aspect of the present invention a color reproduction correction method for an imaging apparatus that obtains color signals with a plurality of spectral characteristics by imaging an object to be imaged, and that obtains a color image by subjecting these signals to signal processing, including the steps of determining the constant values of correction matrix operation so that the value obtained by converting the position on a uniform color space of a given color of the object illuminated by a given light source into the corresponding position on the uniform color space when white light from the reference light source of a display device, which uses as reference white light, a light source that may not coincide with the white light of the light source used for the illumination (taking into consideration the adaptive effect of the eyes). Also, the position on the uniform color space of the color that is obtained when output signals produced by applying the correction matrix operations to the color signals of the imaging device imaging the object to be imaged are displayed by means of the display device are capable of approximating each other, thus insuring that the visual appearance of the color of the object under illumination is approximately comparable to the visual appearance of the color of the image obtained by displaying by means of the display device, wherein the output signals are obtained by imaging the illuminated object by the imaging apparatus.

In the first embodiment of the present invention such a method determines accurate constant values for correction matrix operations by simple processing.

In a still further aspect, a color reproduction correction method for an imaging apparatus that obtains color signals with a plurality of spectral characteristics by imaging an object to be imaged, and that obtains a color image by subjecting these signals to signal processing includes the steps of determining the constant value of correction matrix operation so that values obtained by converting the positions on a uniform color space of each of a plurality of colors of the object to be imaged illuminated by light source into the respective corresponding positions on the uniform color space in the case of white light from the reference light source of a display device which uses as reference white light a light source that may not coincide with the white light of the light source used for the illumination (taking into consideration the adaptive effect of the eyes). The positions on the uniform color space of colors corresponding to the respective colors of the object of imaging that are obtained when output signals produced by applying the correction matrix operation to the color signals of the imaging device imaging the object of imaging of the display device are minimized, thus ensuring that the visual appearance of the of colors of the object to be imaged under the illumination is approximately comparable to the visual appearance of the colors corresponding to the respective colors of the object of imaging in an image obtained by displaying by means of the display device the output signals obtained by imaging the illuminated object of imaging by means of the imaging apparatus.

The constant value of the correction matrix operation is determined so that the mean value of the absolute values of the distances are minimized for a plurality of colors of the object to be imaged. Therefore, color reproduction correction can be accurately performed for many colors, thus allowing higher-fidelity color reproduction.

The correction matrix operation may also be constructed so that each of the plurality of output signals following the correction operation is expressed as the sum of one color signal of the plurality of color signals and the values obtained by multiplying each of a plurality of difference signals between the plurality of color signals by a constant. Also, the sum of the coefficients, in the row directions of the correction matrices, can be set equal to 1 by performing the correction matrix operation on signals that have been subjected to white balance processing. Therefore, corrected outputs can be obtained as the sums of the values obtained by applying the correction matrix operation to two color difference signals and the color signals prior to correction. This technique reduces the number of variables required for color reproduction correction.

Furthermore, it is desirable that the color signals, with a plurality of spectral characteristics, be selected so that the variation in the constants applied to the difference signals between the plurality of color signals in the correction matrices of the respective color signals is minimized, even if the illumination of the object to be imaged varies.

By using color filters with the appropriate spectral characteristics, it is possible to reduce the variation in the constants thus applied to the difference signals between the plurality of color signals in the correction matrices of the respective color signals, thereby further reducing the number of variables in the correction matrices of the respective color signals.

Thus, in the present invention, by taking the color adaptation of the human eye into account, it is possible to optimize color reproduction by means of a simply constructed apparatus. Accordingly, colors that approximate the colors seen at the time of imaging can be reproduced in a display device.

Since color difference signals are used for correction, the number of correction coefficients required can be reduced and the apparatus can be simplified as well as reduced in the size. In addition, if appropriate spectral characteristics are applied to the imaging apparatus, some of the coefficients may be eliminated.

Additionally, by performing the correction processing, following white balance processing, it is possible to simplify the construction of the apparatus and to achieve more accurate correction of color during reproduction.

It is to be understood that both the foregoing general description and the following detailed description are exemplary and explanatory and are intended to provide further explanation of the invention as claimed.

BRIEF DESCRIPTION OF THE DRAWINGS

The accompany drawings, which are included to provide a further understanding of the invention and are incorporated in and constitute a part of this specification, illustrate embodiments of the invention and together with the description service to explain the principles of the invention. In the drawings:

FIG. 3 is an explanatory diagram illustrating one example of the filter arrangement in the imaging element employed in the second embodiment of the present invention, as shown in FIG. 2;

FIG. 5 is a graph that depicts the improved results obtained by the present invention color reproduction.

DETAILED DESCRIPTION OF THE PREFERRED EMBODIMENTS

Figure 1:
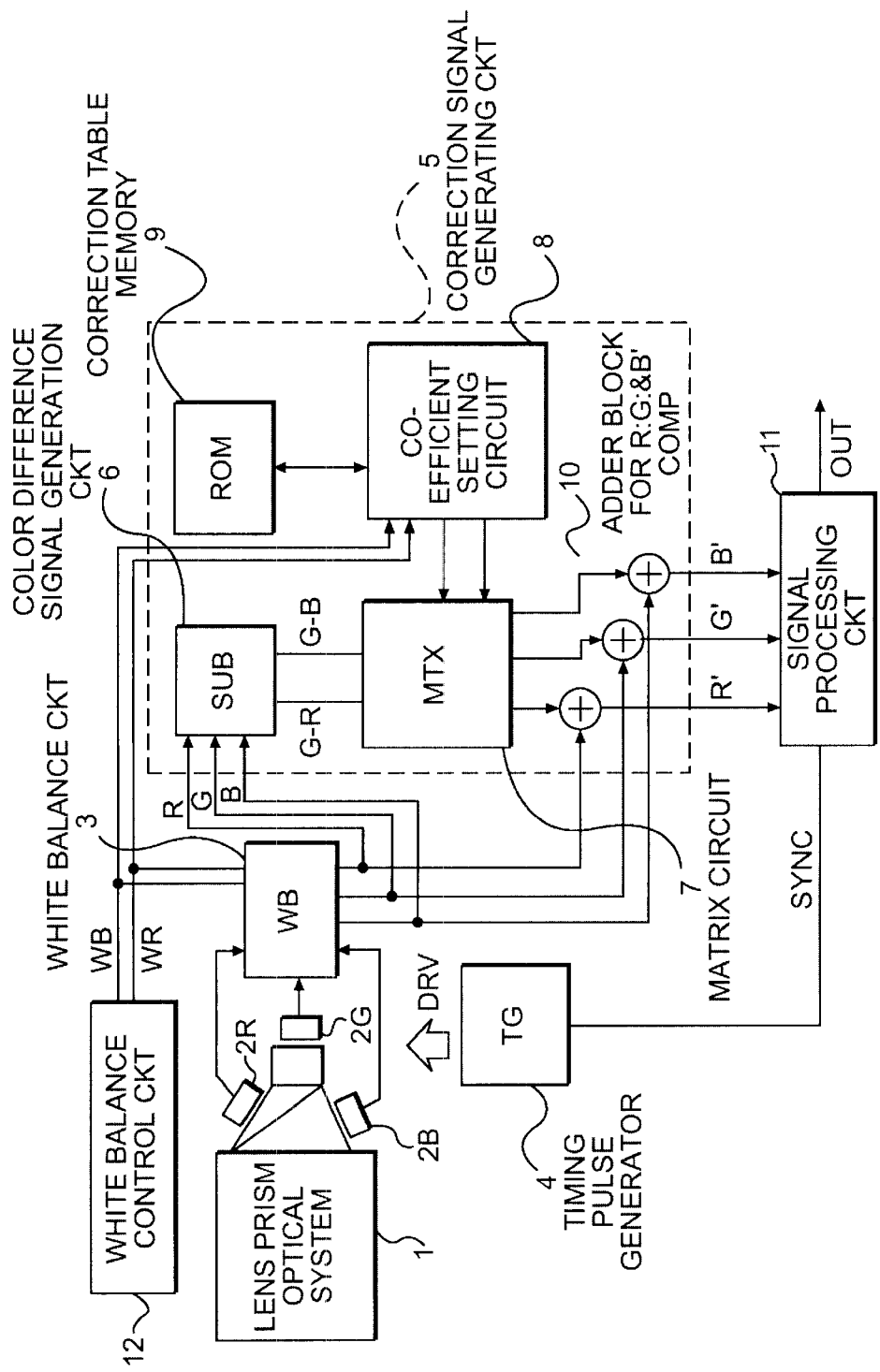
FIG. 1 is a block diagram that illustrates the schematic construction of an imaging apparatus used in a first embodiment of the present invention.

Reference will now be made in detail to the preferred embodiments of the present invention, examples of which are illustrated in the accompanying drawings.

Generally, in order to express differences between colors viewed by the eyes, colors are expressed on a uniform color space, and distances between two given colors are defined and utilized. These distances are referred to as "color differences". The positions of given colors on a uniform color space, e.g., the components in the chromaticity diagram CIE Lu*v* space or the L*a*b* commonly used in practical applications, are calculated from the ratios of the physical calorimetric stimulus values XYZ and the stimulus value components Xn, Yn, Zn of the reference white color, generally the color of the illumination, used in each case. For example, the components of the CIE of L*a*b* are calculated from X/Xn, Y/Yn, and Z/Zn by means of a stipulated calculation formula. Consequently, colors based on a different reference white color cannot be directly compared. It means that colors of objects illuminated by different light sources cannot be directly compared. Therefore, in order to compare two colors based on different reference white colors, at least, the appearance of one of the two colors must be converted to an appearance of color based on another reference white color. Otherwise, the appearances of both of the two colors must be converted to the appearances of colors based on the other known reference white color. These converted color appearances are referred to as "corresponding colors." The conversion is expressed as a conversion of the stimulus values of objects XYZ, since the stimulus values of the reference white color XnYnZn should be known.

To match the colors viewed directly by the human eye, a display device must convert the visual stimulus values of the colors. The conversion is taken from the directly viewed object at the time of imaging under the respective illumination into visual stimulus values of colors that appear to be the same colors upon reproduction by a display device with a different reference white color. In other words, it is necessary to determine the corresponding colors and to ensure that these are the same as the visual stimulus values of the colors that are displayed when the object was imaged. The colors of the imaged object, viewed directly under the illumination source, should appear the same as the colors of the imaged object that are seen when the object is displayed by the display device.

This conversion of stimulus values is equivalent to expressing the color's appearance, as seen under the attendant illumination, as the color's appearance as seen under a different illumination. Thus, a model of the color adaptation of the human eye can be applied to this conversion.

The visual stimulus values, with respect to the human eye, of the object to be imaged as seen under the attendant illumination, are measured and are converted into the stimulus values produced under the light source that expresses the reference white color of the display device. The resulting values are used as reference stimulus values. The object is imaged and a correction matrix method is applied. If the correction matrix coefficients are determined so that the error that is produced, when the imaged stimulus values are determined from the values and compared with the previously determined reference stimulus values is minimized, color reproduction will be optimized for the object under its respective illumination.

If this relationship is expressed as an equation, the following Equation 1 is obtained.

$$H*A*\begin{vmatrix}r\\g\\b\end{vmatrix}=A*C*\begin{vmatrix}R\\G\\B\end{vmatrix} \quad (1)$$

Here, R, G, and B are the outputs of the imaging apparatus, while r, g, and b indicate the colors of the object of imaging in the RGB color expression system of the NTSC. Furthermore, A indicates the matrix circuit that determines the colorimetric stimulus values X, Y, and Z from the RGB color expression system and H indicates the color adaptation matrix that performs a conversion to the colorimetric stimulus values displayed by the display device. C indicates the correction matrix that performs color reproduction correction of the R, G, and B signals.

If the von Kries model is followed, the color adaptation matrix can be derived as follows:

S1, S2, and S3 are the stimulus values applied to the cones of the retina when the object to be imaged is seen under the attendant illumination. The colorimetric stimulus values XYZ are related to S1, S2, and S3 by the conversion matrix M as indicated by Equation 2 below:

$$\begin{bmatrix} S1 \\ S2 \\ S3 \end{bmatrix} = M * \begin{bmatrix} X \\ Y \\ Z \end{bmatrix} \quad (2)$$

Furthermore, the calorimetric stimulus values XYZ have the following relationship as indicated by Equation 3:

$$\begin{bmatrix} X \\ Y \\ Z \end{bmatrix} = A * \begin{bmatrix} r \\ g \\ b \end{bmatrix} \quad (3)$$

If the response of the cones of the retina, in a case where the human eye undergoes color adaptation to the colors of the light source, is indicated as S'1, S'2, and S'3 and Sw1, Sw2, and Sw3 are used to express the stimulus values of the white light of the light source, then S'i (i=1 to 3) can be expressed as shown by Equation 4 as follows:

$$S'i = \frac{Si}{Swi} \quad (i = 1, 2, 3) \quad (4)$$

Thus the imaged object is displayed by the display device. The stimulus values and response values of the cones of the retina, when viewed directly, are designated as Sci and Sc'i (i=1 to 3) and the stimulus values, with respect to the cones of the retina of the white reference color of the display device, are designated as Swci (i=1 to 3). If S'i=Sc'i (i=1 to 3), then ix follows that the colors appear to be the same. Therefore, the relationship, as shown by Equation 5, is as follows:

$$\frac{Si}{Swi} = S'i = Sc'i = \frac{Sci}{Swci} \quad (i = 1, 2, 3) \quad (5)$$

Rewriting Equation 5 in matrix form produces Equation 6, as follows:

$$\begin{bmatrix} \frac{1}{Sw1} & 0 & 0 \\ 0 & \frac{1}{Sw2} & 0 \\ 0 & 0 & \frac{1}{Sw3} \end{bmatrix} * \begin{bmatrix} S1 \\ S2 \\ S3 \end{bmatrix} = \begin{bmatrix} \frac{1}{Scw1} & 0 & 0 \\ 0 & \frac{1}{Scw2} & 0 \\ 0 & 0 & \frac{1}{Scw3} \end{bmatrix} * \begin{bmatrix} Sc1 \\ Sc2 \\ Sc3 \end{bmatrix} \quad (6)$$

Substituting Equation (2) into Equation 6 produces Equation (7), as follows:

$$\begin{bmatrix} \frac{1}{Sw1} & 0 & 0 \\ 0 & \frac{1}{Sw2} & 0 \\ 0 & 0 & \frac{1}{Sw3} \end{bmatrix} * M * \begin{bmatrix} X \\ Y \\ Z \end{bmatrix} = \quad (7)$$

-continued $$\begin{bmatrix} \frac{1}{Scw1} & 0 & 0 \\ 0 & \frac{1}{Scw2} & 0 \\ 0 & 0 & \frac{1}{Scw3} \end{bmatrix} * M * \begin{bmatrix} Xc \\ Yc \\ Zc \end{bmatrix}$$

Here, Xc, Yc, and Zc indicate the display colors in the display device.

This is the same as the left side of Equation 1. Accordingly, if Equation 7 is rewritten, the following equation is obtained:

$$M^{-1} * \begin{bmatrix} \frac{1}{Sw1} & 0 & 0 \\ 0 & \frac{1}{Sw2} & 0 \\ 0 & 0 & \frac{1}{Sw3} \end{bmatrix}^{-1} * \begin{bmatrix} \frac{1}{Scw1} & 0 & 0 \\ 0 & \frac{1}{Scw2} & 0 \\ 0 & 0 & \frac{1}{Scw3} \end{bmatrix} * \quad (8)$$

$$M * \begin{bmatrix} X \\ Y \\ Z \end{bmatrix} = \begin{bmatrix} Xc \\ Yc \\ Zc \end{bmatrix}$$

Comparing Equation 1 and Equation 8, and considering the relationship in Equation 3, H in the Equation 1 can be expressed in Equation 9 as follows:

$$H = M^{-1} * \begin{bmatrix} \frac{Scw1}{Sw1} & 0 & 0 \\ 0 & \frac{Scw2}{Sw2} & 0 \\ 0 & 0 & \frac{Scw3}{Sw3} \end{bmatrix} * M \quad (9)$$

In other words, the color adaptation matrix H can be expressed, as shown in Equation 9, using the stimulus values of the light source with respect to the cones at the retina, Swi and Swci and the conversion matrix M from the colorimetric stimulus values XYZ. Thus, if the colorimetric stimulus values of the light source of Equation 2 are known, Swi and Swci can also be calculated and the color adaptation matrix H can be calculated.

Additionally, if the elements of the correction matrix C are determined from R, G, B and r, g, b given by Equation 1, the correction matrix is determined. The correction matrix C is a matrix of 3 rows×3 columns and, so long as no constraining conditions are applied to the matrix, the matrix is definitively determined if the values of at least three colors are known.

However, even if the matrix is optimized in all respects, the matrix is not necessarily optimal for all colors. Accordingly, optimization for the attendant light source is accomplished if the correction matrix C is determined so that the averages of the errors of as many colors as possible are minimized. Since this is a linear regression problem, correction can be calculated using the nominal equations for a linear regression.

In actuality, it would appear that the optimal correction matrix C varies with a variation in the illumination. Although it would be possible in principle to prepare correction matrices as functions of all possible types of illumination, such a procedure is impractical. A more efficient procedure is to determine correction matrices for several typical light sources, and to determine the correction matrix C for the illuminating light source in question by interpolation from the tabulated correction matrix values for a plurality of light sources, which are close to the illuminating light source, using the output of the light source inferring device, e.g., the white balance control signal of a television camera.

Furthermore, if correction matrix operations are applied to the white-balanced signals of a plurality of imaged color signals, e.g., signals of the three colors red, green, and blue, then white should appear white even after correction. The constraint that there be no variation in the white balance may also be applied. If this is done, then the sum of the coefficients of the correction matrix C in the row direction may be viewed as 1. If the color signals prior to the application of color correction are designated as R, G, and B, and the signals following correction are designated as R', G', and B', then R', G', and B' can be written as shown in Equation 10.

$$\begin{vmatrix} R' \\ G' \\ B' \end{vmatrix} = \begin{vmatrix} Crr & Crb \\ Cgr & Cgb \\ Cbr & Cbb \end{vmatrix} * \begin{bmatrix} G-R \\ G-B \end{bmatrix} + \begin{vmatrix} R \\ G \\ B \end{vmatrix} \quad (10)$$

Correction can be realized by adding, to the respective signals, correction signals produced by a matrix operation of 3 rows×2 columns in which (G-R) and (G-B) are taken as variables. In other words, by applying such constraints, the number of variables used for color reproduction correction, which was previously 9, can be reduced to 6.

A detailed description of the working embodiments of the present invention will now be described. FIG. 1 illustrates the schematic construction of an imaging apparatus used in the first embodiment of the present invention, in which the present invention is applied to a three-plate color television camera. The apparatus, as shown in FIG. 1, is equipped with a lens-prism optical system 1, an imaging element 2r for red (among the three colors R, G, and B), an imaging element 2g for green, an imaging element 2b for blue, a white balance circuit 3, a timing pulse generator 4, a correction signal generating circuit 5, a signal processing circuit 11, and a white balance setting control circuit 12. The correction signal generating circuit 5 is equipped with a color difference signal generating circuit 6, a matrix circuit 7, a coefficient setting circuit 8, a correction coefficient table memory 9, and an adder block 10, which contains three adders for the respective colors R, G and B.

The lens-prism optical system 1 is used to conduct image light from the object to be imaged (not shown in the figures) to the respective imaging elements 2r, 2g, and 2b for the three colors R, G, and B. The imaging elements 2r, 2g, and 2b are constructed from respective CCD imaging elements, or the like. The white balance circuit 3 performs gain correction for the respective colors so that the values of the red signal output R and blue signal output B are both equal to the value of the green signal output G in cases where a white paper or white light source is imaged as the object to be imaged. The control signals used for this gain correction are Wr and Wb, which are generated by the white balance setting control circuit 12. The respective gains of the R and B signals are adjusted on the basis of the values of these control signals Wr and Wb. Furthermore, when the white balance setting control circuit 12 as shown in FIG. 1 is used, the adjustment of the white balance is ordinarily performed manually. However, it is also possible to construct a circuit so that the adjustment of the white balance is performed automatically.

The timing pulse generator 4 provides the timing and control pulses required for the respective circuits. Specifically, the timing pulse generator 4 supplies driving control signals to the respective imaging elements 2r, 2g, and 2b and supplies synchronizing pulses to the signal processing circuit 11.

In the correction signal generating circuit 5, the color difference signal generating circuit 6 generates the color difference signals (G-R) and (G-B) from the signals for the respective colors R, G, and B input from the white balance circuit 3. The matrix circuit 7 obtains correction signals for the respective colors by performing matrix operations, with coefficient values from the coefficient setting circuit 8, on the color difference signals (G-R) and (G-B). Specifically, the matrix circuit 7 generates a correction term for the first term on the right side of the Equation 10. The correction coefficient table memory 9 stores a table of matrix constants determined beforehand for a plurality of light sources wherein the memory 9 is a ROM.

The coefficient setting circuit 8 determines the coefficients used for matrix operations by receiving the values of the white balance control signals Wr and Wb, inferring the type of illuminating light source involved, and reading out the required matrix constant data from the correction coefficient table memory 9.

The matrix circuit 7 determines correction signals for the respective colors by performing matrix operations on the color difference signals (G-R) and (G-B) using coefficient values from the coefficient setting circuit 8. The adder block 10 adds the correction signals for the respective colors from the matrix circuit 7 and the original signals for the respective colors from the white balance circuit 3, thus creating corrected signals R', G', and B' for the respective colors. The adder block then inputs these signals into the signal processing circuit 11. The signal processing circuit 11 performs prescribed signal processing on these corrected signals R', G', and B' and generates and outputs a standard television signal.

In the imaging apparatus, as shown in FIG. 1, the gain values of the video signals obtained by the imaging elements 2r, 2g, and 2b, for the respective colors, are corrected by the white balance circuit 3 so that the signal values, for the respective colors, are equal to each other when white is imaged. The correction signals, as for the respective colors, are then determined by the color difference signal generating circuit 6, matrix circuit 7, coefficient setting circuit 8, and correction coefficient table memory (9). These correction signals, for the respective colors, are added by the adder block 10 to the original white-balance-corrected color signals R, G, and B output by the white balance circuit 3, so that corrected color signals R', G', and B' for the three colors, as indicated by the Equation 6, are determined. In other words, an accurate correction treatment can be performed by means of a simple circuit construction by performing color reproduction correction using respective color signals that have been subjected to white balance correction.

Figure 2:
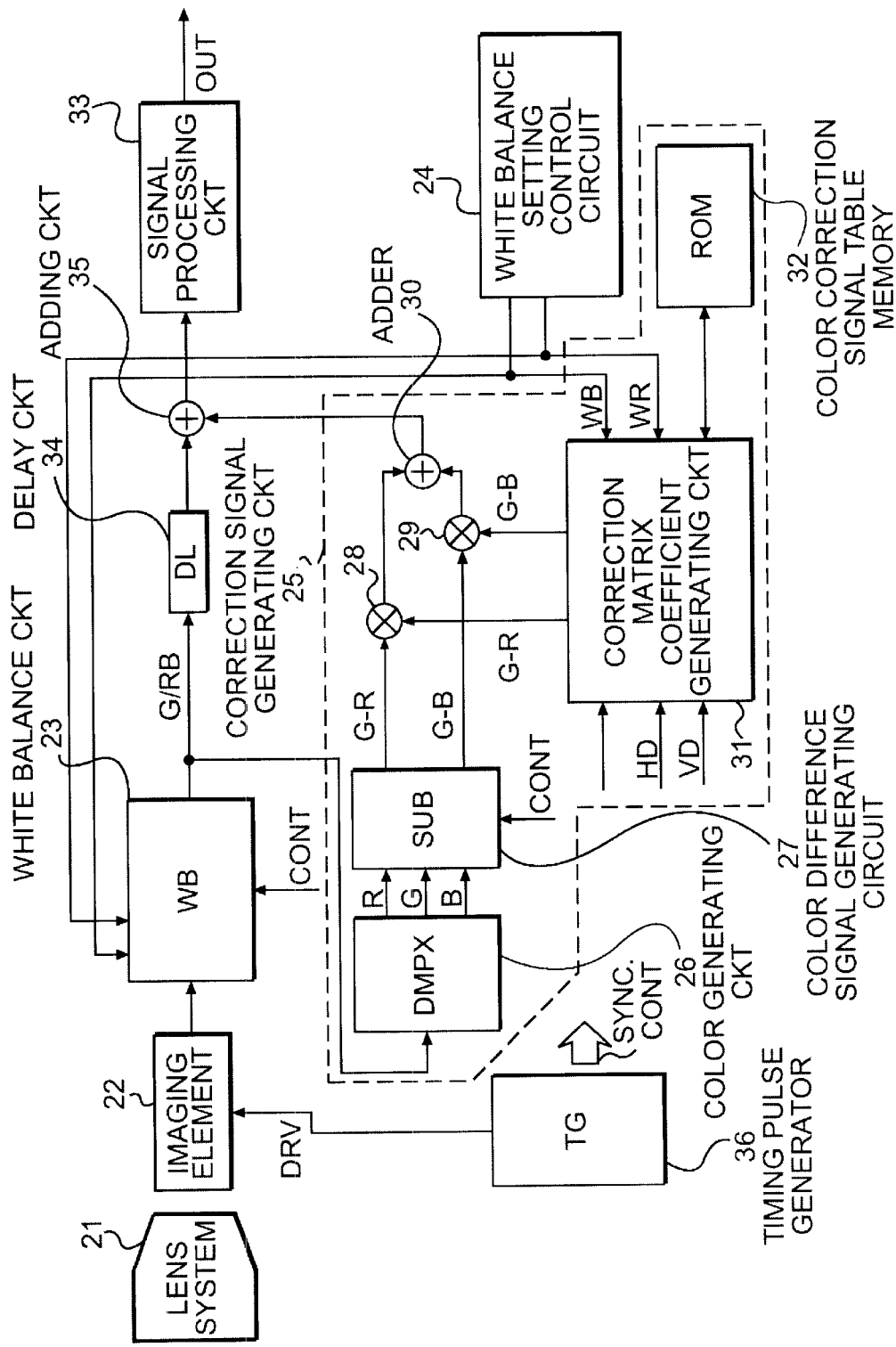
FIG. 2 is a block diagram that illustrates the schematic construction of an imaging apparatus used in a second embodiment of the present invention.
Figure 3:
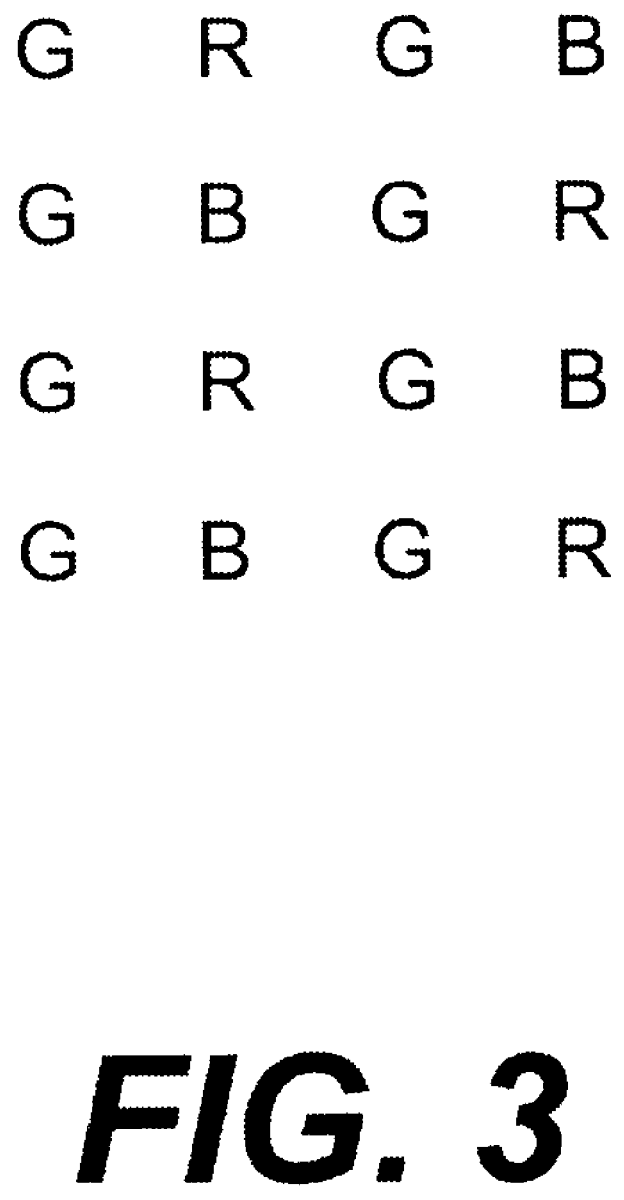

FIG. 2 shows the schematic construction of an imaging apparatus used in a second embodiment of the present invention. This figure illustrates an embodiment in which the present invention is applied to a single-plate color camera. FIG. 3 shows an example of the imaging element 22 used in the imaging apparatus, as shown in FIG. 2, and illustrates the arrangement of the red (R), green (G), and blue (B) filters for each pixel. Moreover, in order to simplify the graphic illustration, FIG. 3 shows a exemplary 4×4 matrix, totaling 16 pixels. The reader should note that the present invention is not limited to such a construction. Numerous additional pixels are used and the filter arrangement as shown in FIG. 3 is repeated for the required number of pixels. In the imaging element as shown in FIG. 3, the scanning of the pixels is such that the pixels are scanned one row at a time in a horizontal sequence in a right to left direction starting from the upper left hand pixel. The signals are successively outputted in the order GRGB, GBGR, GRGB, GBGR, and so on.

Returning now to FIG. 2, the imaging apparatus is constructed from a lens optical system 21, the imaging element 22, a white balance circuit 23, a white balance setting control circuit 24, a correction signal generating circuit 25, a signal processing circuit 33, a delay circuit 34, an adding circuit 35, and a timing pulse generator 36. Furthermore, the correction signal generating circuit 25 is equipped with a color separating circuit 26, a color difference signal generating circuit 27, multipliers 28 and 29, an adder 30, a correction matrix coefficient generating circuit 31, and a color correction signal table memory 32.

In the imaging apparatus as shown in FIG. 2, image light from the object to be imaged, not shown in the figures, which has passed through the lens optical system 21 is input into imaging element 22. Imaging element 22 is equipped with the color filters so that time-series video signals for the respective colors are generated. These video signals are input into the white balance circuit 23 and a white balance is obtained by adjusting the amplification of the respective color signals for R, G, and B (input in a time-series manner) according to the respective colors. The control signals used for this amplification adjustment are Wr and Wb for R and B, respectively. The adjustment is fixed with respect to the G signal.

The white balance setting control circuit 24 measures the white balance of the light source and outputs control signals Wr and Wb corresponding to the type of light source used. The white balance setting control circuit is ordinarily constructed so its operation is performed automatically. However, it is also possible to construct the circuit so that the control signals Wr and Wb are output by manual adjustment of the white balance.

In the correction signal generating circuit 25 the video signals, supplied in a time-series manner from the white balance circuit 23, are separated according to the respective colors by the color separating circuit 26, thus producing signals R, G, and B for the respective colors. The color difference signal generating circuit 27 generates two color difference signals (G-R) and (G-B) from these color signals R, G, and B.

The respective multipliers 28 and 29 multiply the color difference signals (G-R) and (G-B) by matrix coefficients supplied by the correction matrix coefficient generating circuit 31 and are summed by the adder 30, which produces corrected signals corresponding to the colors of the original signals.

In the correction matrix coefficient generating circuit 31, the white balance control signals Wr and Wb are input and correction amounts corresponding to one or more light sources, approximating the light source inferred from these values, are read out from the color correction signal table memory 32. The optimal correction coefficients are then determined by performing operations on these correction amounts. The control signals from the color separating circuit 26 are then inputted and correction coefficients, corresponding to the colors of the original signals output as time series, are generated and supplied to the multipliers 28 and 29. Thus, by constructing the device so that processing is performed on the signals following white balance correction, it is possible to reduce the number of multiplier and adders required, which was originally six, to two each.

The correction signals output by the correction signal generating circuit 25 are supplied to the adder 35, and are added to the original signals to which delay times have been applied by the delay circuit 34, thus producing a corrected time-series signal sequence of R', G', and B'. This signal sequence is processed by the well-known signal processing circuit 33 of a single-plate imaging device, so that the required video signal, e.g., a standard television signal, is generated and output.

As shown in FIGS. 1 and 2, the light source inferring device includes the white balance setting control circuit 12 and coefficient setting circuit 8, as shown in FIG. 1, and the white balance setting control circuit 24 and correction matrix coefficient generating circuit 31 shown in FIG. 2. The memory device includes the coefficient setting circuit 8 and ROM 9, as shown in FIG. 1, and to a combination of the correction matrix coefficient generating circuit 31 and ROM 32, as shown in FIG. 2. The operating device includes the matrix circuit 7 and adder 10, as shown in FIG. 1, and the difference signal generating circuit 27, multipliers 28 and 29 and adders 30 and 35, as shown in FIG. 2.

With respect to the second embodiment of the present invention, the light source inferring device includes the white balance setting control circuit and correction matrix coefficient generating circuit 31, as shown in FIG. 2. Furthermore, the memory device includes the correction matrix coefficient generating circuit 31 and ROM 32, as shown in FIG. 2. Additionally, the constant inferring device includes to the correction matrix coefficient generating circuit 31, as shown in FIG. 2. Moreover, the operating device includes the difference signal generating circuit 31, the multipliers 28 and 29 and the adders 30 and 35, as shown in FIG. 2.

Figure 4:
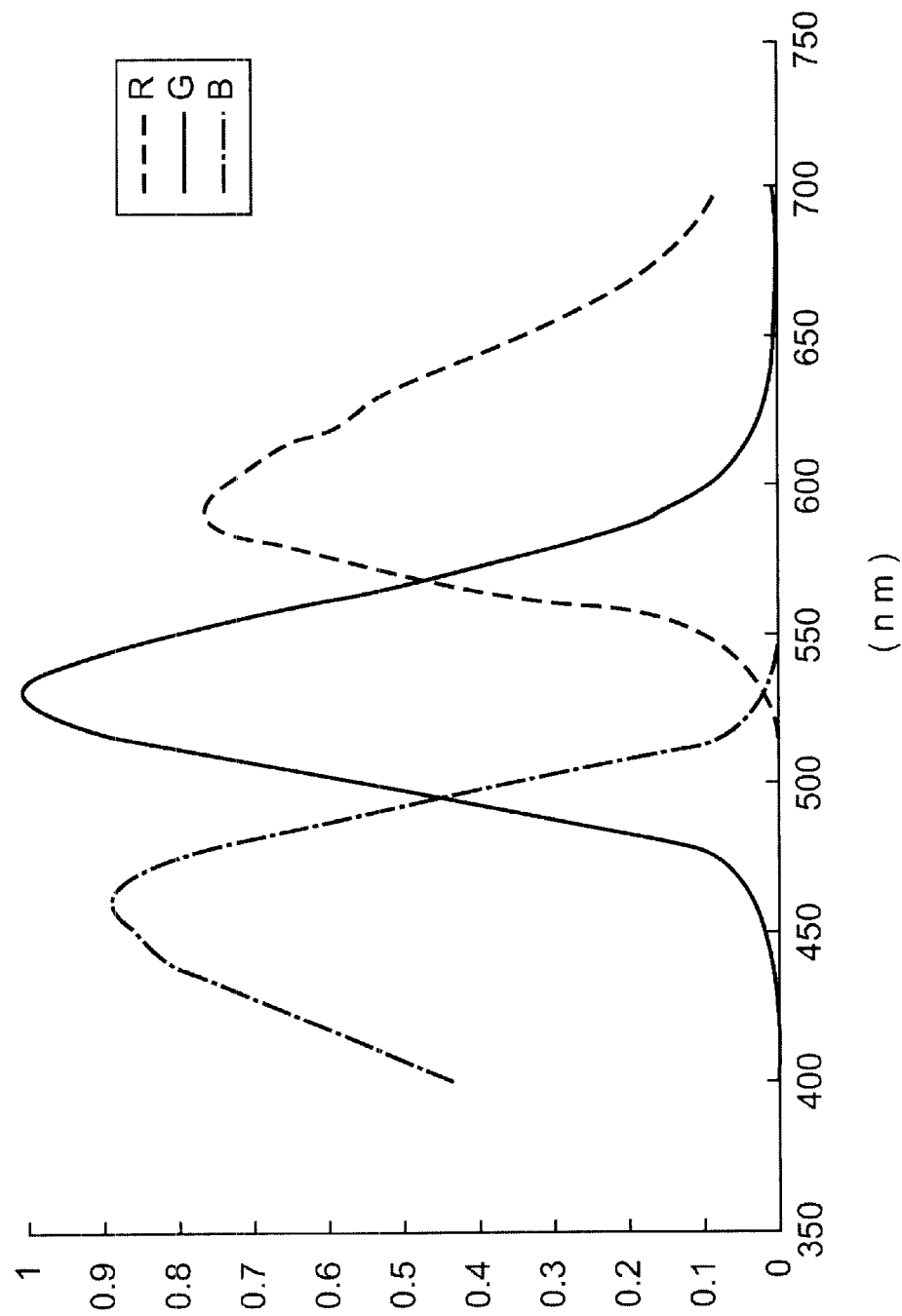
FIG. 4 is a graph depicting the spectral characteristics of the imaging element used in the second embodiment of the present invention, as shown in FIG. 2.

FIG. 4 shows an example of the spectral sensitivity for the respective colors R, G. and B when the imaging element is that used in the imaging apparatus of FIG. 2. This spectral sensitivity is affected by the spectral characteristics of the standard imaging lens used. An exemplary example will now be described in which correction matrices are determined by applying the present invention to an imaging apparatus in which imaging is performed using an imaging device containing such an imaging element. The results are displayed on an NTSC ideal receiver.

A sufficient number of objects of imaging with known spectral reflectivity transmissivity values were prepared and the calorimetric stimulus values X, Y, and Z under the attendant illumination light source with a known spectral reflectivity were determined. Using the color adaptation conversion matrix, the colorimetric stimulus values Xc, Yc, and Zc of the corresponding colors corresponding to the respective colors of an NTSC reference light source C, were determined. By applying the conversion matrix for conversion to the NTSC RGB color expression system to these values, the values r, g, and b for the RGB signals, which act as standards for the respective colors, were determined.

The values of the respective colors R, G, and B, at the imaged object by the illuminating light in a white-balanced state, were determined from the spectral characteristics of the imaging apparatus and the coefficients of the correction matrix C were determined by linear regression so that the mean values of the errors between the values R', G', and B' and the reference colors r, g, and b for the respective colors with the correction matrix C applied under constraints preventing destruction of the white balance, were minimized.

FIGS. 5(a) and 5(b) show an example of the improvement of the color differences for the colors of various objects to be imaged. Imaging was performed using light source A corrected using correction coefficients determined by such a method as compared to where correction was not performed. The horizontal X-axis is used for convenience in indicating the numbers of the objects to be imaged. FIG. 5(a) shows the color differences determined by conversion from the values of the RGB color expression system, prior to correction to the CIE Lab color expression system directly from the values of the respective colors without the application of the correction matrix C. Furthermore, FIG. 5(b) shows the color differences determined when the values were converted to the CIE Lab color expression system following the application of the correction matrix C. These figures illustrate that the color differences are improved by the present invention.

Figure 6A:
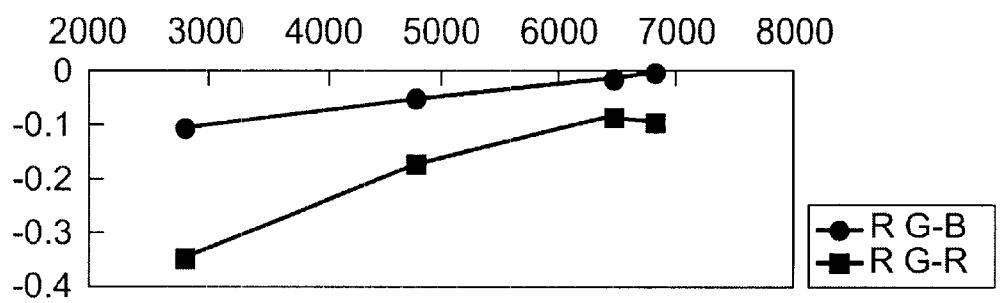
FIGS. 6(a)–6(c) are graphs that depict examples of the color reproduction correction matrix coefficients obtained for various types of light sources.
Figure 6B:
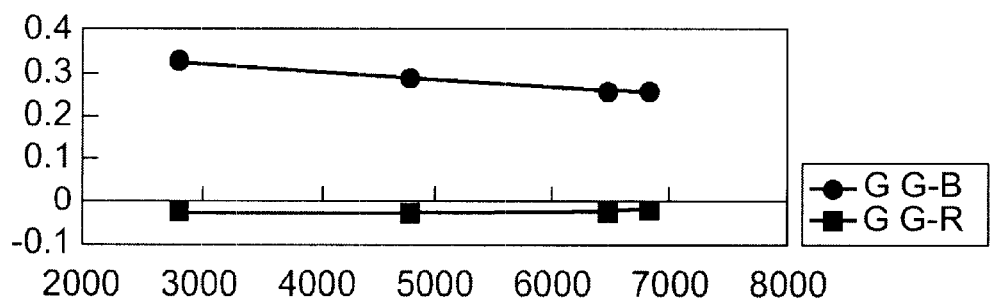
Figure 6C:
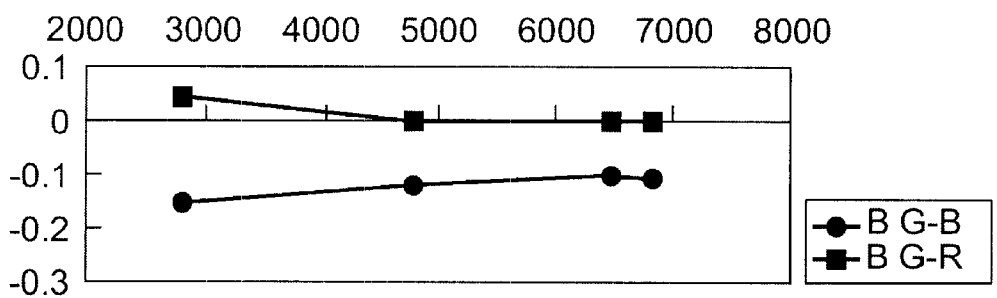

FIGS. 6(a), 6(b) and 6(c) show the correction coefficients determined for various light sources. The horizontal X-axis indicates the color temperature of the light source. FIG. 6(a) shows correction coefficients for the red signal wherein these coefficients indicate amounts of correction as coefficients for (G-R) and (G-B) under constraining conditions, which are such that there is no destruction of the white balance. Similarly, FIG. 6(b) shows correction coefficients for the green signal, and FIG. 6(c) shows correction coefficients for the blue signal.

As is shown by the (G-R) coefficients for the green signal and the (G-B) coefficients for the blue signal, coefficients that are small and show little variation are obtained in some cases. If color filters with appropriate spectral characteristics are used with such coefficients, illumination with different color temperatures has little effect on the results even if the amount of correction of the color difference signals is close to zero. In such cases, the parameters of the correction signals can be further reduced in number.

By thus storing correction coefficients determined for various light sources in the correction table memory 32, as shown in FIG. 2, it is possible to perform favorable color reproduction correction.

It will be apparent to those skilled in the art that various modifications and variations can be made in the color reproduction correction device and correction method for an imaging apparatus of the present invention without departing from the spirit or scope of the invention. Thus, it is intended that the present invention cover the modifications and variations of this invention provided they come within the scope of the appended claims and their equivalents.

What is claimed is:

1. A color reproduction correction device for an imaging apparatus that obtains color signals having a plurality of spectral characteristics by imaging an object, and generates a color image to be displayed by subjecting the color signals to signal processing, the color reproduction correction device comprising:

a light illuminating source inferring device for inferring an illuminating light source;

memory means that stores, for each of a plurality of illuminating light sources, constants for correction matrix operations; and an operating means that extracts from the memory means the correction matrix constants corresponding to the inferred illuminating light source, at the time of the imaging, and performs correction matrix operations on the color signals to be reproduced, wherein the constants of the correction matrix operations are determined by minimizing a mean value of an absolute value of distances between:

(a) corresponding color positions on a uniform color space, obtained by converting positions of each of a plurality of colors of the object illuminated by its respective inferred illuminating light source, into the corresponding positions on the uniform color space for a display device; and (b) corresponding color positions on the uniform color space of color signals corresponding to respective colors of the object obtained when output color signals are produced by applying correction matrix operations to the color signals of the imaging apparatus illuminating light source, and are displayed by the display device, and wherein a reference white color of the display device is different than a reference white color of the illuminating light source.

2. The color reproduction correction device for an imaging apparatus according to claim 1, wherein the light illuminating source inferring device infers the type of the illuminating light source based on white balance control signals used for white balance processing of the plurality of color signals.

3. The color reproduction correction device for an imaging apparatus according to claim 2, wherein the the correction matrix operations, for each of the plurality of color signals following the correction operation, is expressed as the sum of:

a) one color signal of the plurality of color signals; and b) values obtained by multiplying each of a plurality of difference signals between the plurality of color signals by a constant.

4. The color reproduction correction device for an imaging apparatus according to claim 3, wherein the operating means performs correction matrix operations on a plurality of color signals by performing white balance processing on the plurality of color signals.

5. The color reproduction correction device for an imaging apparatus according to claim 2, wherein the correction matrix operations, for each of the plurality of color signals following the correction operation, is expressed as the sum of:

a) one color signal of the plurality of color signals; and b) values obtained by multiplying each of a plurality of difference signals between the plurality of color signals by a constant.

6. The color reproduction correction device for an imaging apparatus according to claim 5, wherein the operating means performs correction matrix operations on a plurality of color signals by performing white balance processing on the plurality of color signals.

7. The color reproduction correction device for an imaging apparatus according to claim 1, wherein the operating means performs correction matrix operations on a plurality of color signals by performing white balance processing on the plurality of color signals.

8. A color reproduction correction device for an imaging apparatus that obtains color signals having a plurality of spectral characteristics by imaging an object, and generates a color image to be displayed by subjecting the color signals to signal processing, the color reproduction correction device comprising:

a light illuminating source inferring device for inferring an illuminating light source;

memory means that stores, for each of a plurality of illuminating light sources, constants for correction matrix operations;

a constant inferring means which infers correction matrix constants that approximates most closely the illuminating light source inferred by the light illuminating source inferring device, based on the constants stored in the memory means at the time of imaging; and an operating means which perform correction matrix operations on the color signals based on the correction matrix constants output by the constant inferring means, wherein the constants of the correction matrix operations are determined by minimizing a mean value of an absolute value of distances between:

(a) corresponding color positions on a uniform color space, obtained by converting positions of each of a plurality of colors of the object illuminated by its respective inferred illuminating light source, into the corresponding positions on the uniform color space for a display device; and (b) corresponding color positions on the uniform color space of color signals corresponding to respective colors of the object obtained when output color signals are produced by applying correction matrix operations to the color signals of the imaging apparatus illuminating light source, and are displayed by the display device;

wherein a reference white color of the display device is different than a reference white color of the illuminating light source.

9. The color reproduction correction device for an imaging apparatus according to claim 8, wherein the color signals with a plurality of spectral characteristics are selected so that any variation in the correction matrix constants applied to difference signals between the plurality of color signals in the correction matrix of the respective color signals is minimized.

10. The color reproduction correction device for an imaging apparatus according to claim 9, wherein the correction matrix operations, for each of the plurality of color signals following the correction operation, is expressed as the sum of:

a) one color signal of the plurality of color signals; and b) values obtained by multiplying each of a plurality of difference signals between the plurality of color signals by a constant.

11. The color reproduction correction device for an imaging apparatus according to claim 10, wherein the light illuminating source inferring device infers the type of the illuminating light source based on the white balance control signals used for white balance processing of the plurality of color signals.

12. The color reproduction correction device for an imaging apparatus according to claim 9, wherein the operating means performs correction matrix operations on a plurality of color signals by performing white balance processing on the plurality of color signals.

13. The color reproduction correction device for an imaging apparatus according to claim 8, wherein the correction matrix operations, for each of the plurality of color signals following the correction operation, is expressed as the sum of:

a) one color signal of the plurality of color signals; and b) values obtained by multiplying each of a plurality of difference signals between the plurality of color signals by a constant.

14. The color reproduction correction device for an imaging apparatus according to claim 13, wherein the light illuminating source inferring device infers the type of the illuminating light source based on white balance control signals used for white balance processing of the plurality of color signals.

15. The color reproduction correction device for an imaging apparatus according to claim 14, wherein the operating means performs correction matrix operations on a plurality of color signals by performing white balance processing on the plurality of color signals.

16. The color reproduction correction device for an imaging apparatus according to claim 13, wherein the operating means performs correction matrix operations on a plurality of color signals by performing white balance processing on the plurality of color signals.

17. The color reproduction correction device for an imaging apparatus according to claim 8, wherein the light illuminating source inferring device infers the type of the illuminating light source based on white balance control signals used for white balance processing of the plurality of color signals.

18. The color reproduction correction device for an imaging apparatus according to claim 17, wherein the operating means performs correction matrix operations on a plurality of color signals by performing white balance processing on the plurality of color signals.

19. The color reproduction correction device for an imaging apparatus according to claim 8, wherein the operating means performs correction matrix operations on a plurality of color signals by performing white balance processing on the plurality of color signals.

20. A color reproduction correction method for an imaging apparatus that obtains color signals having a plurality of spectral characteristics by imaging an object, and generates a color image to be displayed by subjecting the color signals to signal processing, the color reproduction correction method comprising the steps of:

inferring a light illuminating source;

storing for each of a plurality of illuminating light sources, constants for correction matrix operations in a memory means; and extracting from the memory means the correction matrix constants corresponding to the inferred illuminating light source, at the time of the imaging, and performs correction matrix operations on the color signals to be reproduced, wherein the constants of the correction matrix operations are determined by minimizing a mean value of an absolute value of distances between:

(a) corresponding color positions on a uniform color space, obtained by converting positions of each of a plurality of colors of the object illuminated by its respective inferred illuminating light source, into the corresponding positions on the uniform color space for a display device; and (b) corresponding color positions on the uniform color space of color signals corresponding to respective colors of the object obtained when output color signals are produced by applying correction matrix operations to the color signals of the imaging apparatus illuminating light source, and are displayed by the display device;

wherein a reference white color of the display device is different than a reference white color of the illuminating light source.

21. The color reproduction correction method for an imaging apparatus according to claim 20, wherein the light illuminating source inferring device infers the type of the illuminating light source based on white balance control signals used for white balance processing of the plurality of color signals.

22. The color reproduction correction method for an imaging apparatus according to claim 20, wherein the correction matrix operations, for each of the plurality of color signals following the correction operation, is expressed as the sum of:
   a) one color signal of the plurality of color signals; and
   b) values obtained by multiplying each of a plurality of difference signals between the plurality of color signals by a constant.

23. The color reproduction correction method for an imaging apparatus according to claim 20, wherein the operating means performs correction matrix operations on a plurality of color signals by performing white balance processing on the plurality of color signals.

24. A color reproduction correction method for an imaging apparatus that obtains color signals having a plurality of spectral characteristics by imaging an object, and generates a color image to be displayed by subjecting the color signals to signal processing, the color reproduction correction method comprising the steps of:
   inferring a light illuminating source;
   storing for each of a plurality of illuminating light sources, constants for correction matrix operations in a memory means;
   inferring correction matrix constants that approximate most closely the illuminating light source inferred by the light illuminating source inferring device, based on the constants stored in the memory means at the time of imaging; and
   performing correction matrix operations on the color signals based on the correction matrix constants output by the constant inferring means,
   wherein the constants of the correction matrix operations are determined by calculating a mean value of an absolute value of a distance between corresponding color positions on a uniform color space, obtained by converting positions of each of a plurality of colors of the object imaged, illuminated by its respective inferred illuminating light source, into the corresponding positions on the uniform color space for a display device, and
   wherein a reference white light of the display device is different than a reference white light of the illuminating light source and the positions of color signals corresponding to respective colors of the object imaged on the uniform color space that are obtained when output color signals produced by applying correction matrix operations to the color signals of the imaging apparatus displayed by the display device, are minimized.

25. The color reproduction correction method for an imaging apparatus according to claim 24, wherein the color signals with a plurality of spectral characteristics are selected so that any variation in the correction matrix constants applied to difference signals between the plurality of color signals in the correction matrix of the respective color signals is minimized.

26. The color reproduction correction method for an imaging apparatus according to claim 24, wherein the correction matrix operations, for each of the plurality of color signals following the correction operation, is expressed as the sum of:
   a) one color signal of the plurality of color signals; and
   b) values obtained by multiplying each of a plurality of difference signals between the plurality of color signals by a constant.

27. The color reproduction correction method for an imaging apparatus according to claim 24, wherein the light illuminating source inferring device infers the type of the illuminating light source based on white balance control signals used for white balance processing of the plurality of color signals.

28. The color reproduction correction method for an imaging apparatus according to claim 24, wherein the operating means performs correction matrix operations on a plurality of color signals by performing white balance processing on the plurality of color signals.

* * * * *